UNITED STATES PATENT OFFICE.

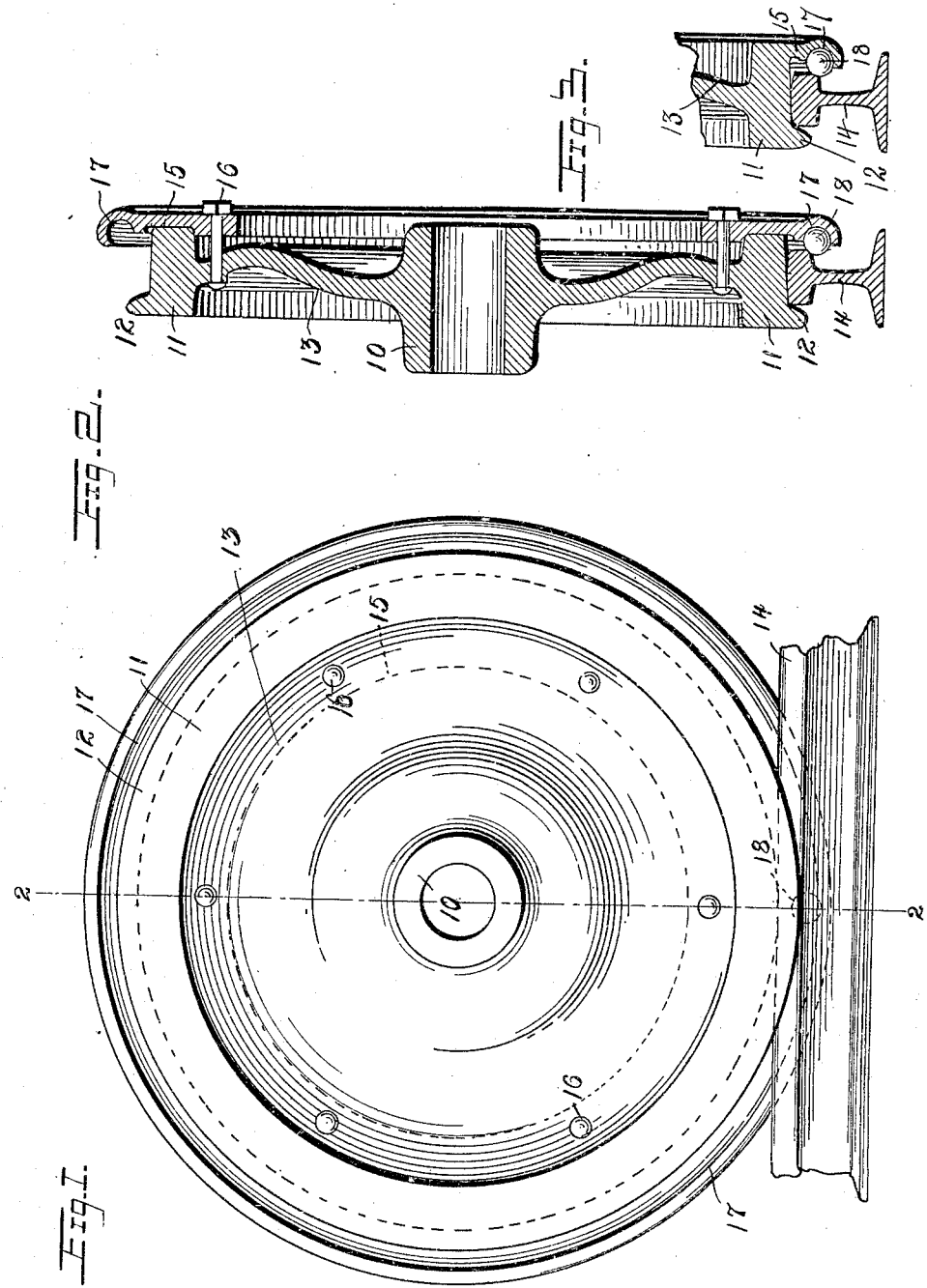

EMIL A. JOHNSON, OF OLIVIA, MINNESOTA.

CAR-WHEEL.

958,924.  Specification of Letters Patent.  Patented May 24, 1910.

Application filed September 20, 1909. Serial No. 518,571.

*To all whom it may concern:*

Be it known that I, EMIL A. JOHNSON, a citizen of the United States, residing at Olivia, in the county of Renville, State of Minnesota, have invented certain new and useful Improvements in Car-Wheels; and I do hereby declare the following to be a full, clear, and exact description of the invention, such as will enable others skilled in the art to which it appertains to make and use the same.

This invention relates to improvements in car wheels, and has for one of its objects to provide a simply constructed attachment whereby the wheels are maintained in locked relations to the track at all points in the revolutions of the wheel.

With this and other objects in view, the invention consists in certain novel features of construction as hereafter shown and described and then specifically pointed out in the claims, and in the drawings illustrative of the preferred embodiment of the invention, Figure 1 represents a car wheel viewed from the inner face and a portion of a track, with the improvement applied to the wheel. Fig. 2 is a section on the line 2—2 of Fig. 1. Fig. 3 is a sectional detail, illustrating a modification in the construction.

The improved device may be applied to car wheels of various construction, and it is not desired therefore to limit the invention to use upon any specific form or size of wheel, but for the purpose of illustration the improved device is shown applied to a conventional car wheel which comprises a hub 10, rim 11 having a flange 12 and a connecting web 13. The car wheel bears by its tread upon the rail, represented at 14.

The improved attachment comprises a member formed with an annular web 15 which bears against the outer end of the rim 11 and is secured in any suitable manner to the wheel, preferably by a plurality of bolts 16 extending through the web 15 of the wheel 13, as shown. Formed upon the annular web 15 at its outer edge is an annular channel 17 semi-circular transversely and forming a seat for a bearing ball 18. The web 15 with its channel 17 extends beyond the rim 11 of the wheel at all sides, so that when the wheel is located upon the rail the channel extends below the tread of the rail, as shown, and the channel 17 is so located that when the wheel is in position upon the rail and the ball 18 within the channel, the ball will constantly project beneath the head or tread of the rail, as shown in Fig. 2. By this means the ball is prevented from dropping from the channel by its position relative to the head of the rail, as will be obvious. The ball also thus projects beneath the rail and forms an effectual lock between the wheel and the rail, and prevents the wheel from being separated from the rail. By this simple arrangement as the wheel rotates upon the rail the ball will retain its position at the lower side of the wheel and of the channel, and effectually lock the wheel to the rail, while at the same time not preventing the rotation of the wheel upon the rail.

In Fig. 3 is shown a modification in the construction, consisting in forming the annular member with its annular channel integral with the wheel, which structure may be employed if preferred.

While the improved devices is designed more particularly for employment with car wheels having the flange 12, it will be understood that the invention is not necessarily limited thereto, as it may be employed under certain conditions upon wheels not having the flange.

What is claimed is:—

1. A car wheel having a flange at one side and with an annular channel spaced from said flange, and a bearing ball located within said channel and adapted to project beneath the head portion of the rail at the side opposite to the flange.

2. A car wheel having a flange at one side and with an annular projection at the side opposite to said flange, said projection having an inwardly opening annular channel, and a bearing ball within said channel and adapted to project beneath the head portion of a rail at the side opposite the flange of the wheel.

3. An attachment for car wheels comprising an annular member having an annular channel in one face, means for attaching said annular member to a car wheel with the channel located beyond the rim of the wheel, and a bearing ball located within said channel and adapted to project beneath the head portion of a rail at the side opposite the flange of the wheel.

4. A wheel having an annular channel spaced from its tread, and a bearing ball located within said channel and adapted to project beneath the head portion of a railway rail.

5. A wheel having an annular projection at one side extending beyond the tread thereof, said projection having an inwardly opening annular channel, and a bearing ball within said channel and adapted to project beneath the head portion of a railway rail.

6. The combination with a wheel including an annular rim having a tread upon its outer face, of an annular member having an annular channel in one face near the outer edge and an annular shoulder near the inner edge, said shoulder bearing against the inner face of the rim portion of the wheel, means for attaching said annular member to said wheel, and a bearing ball located within said annular channel and adapted to project beneath the head portion of a railway rail.

In testimony whereof, I affix my signature, in presence of two witnesses.

EMIL A. JOHNSON.

Witnesses:
H. S. BORDEWICH,
C. G. PLOYHART.